United States Patent Office

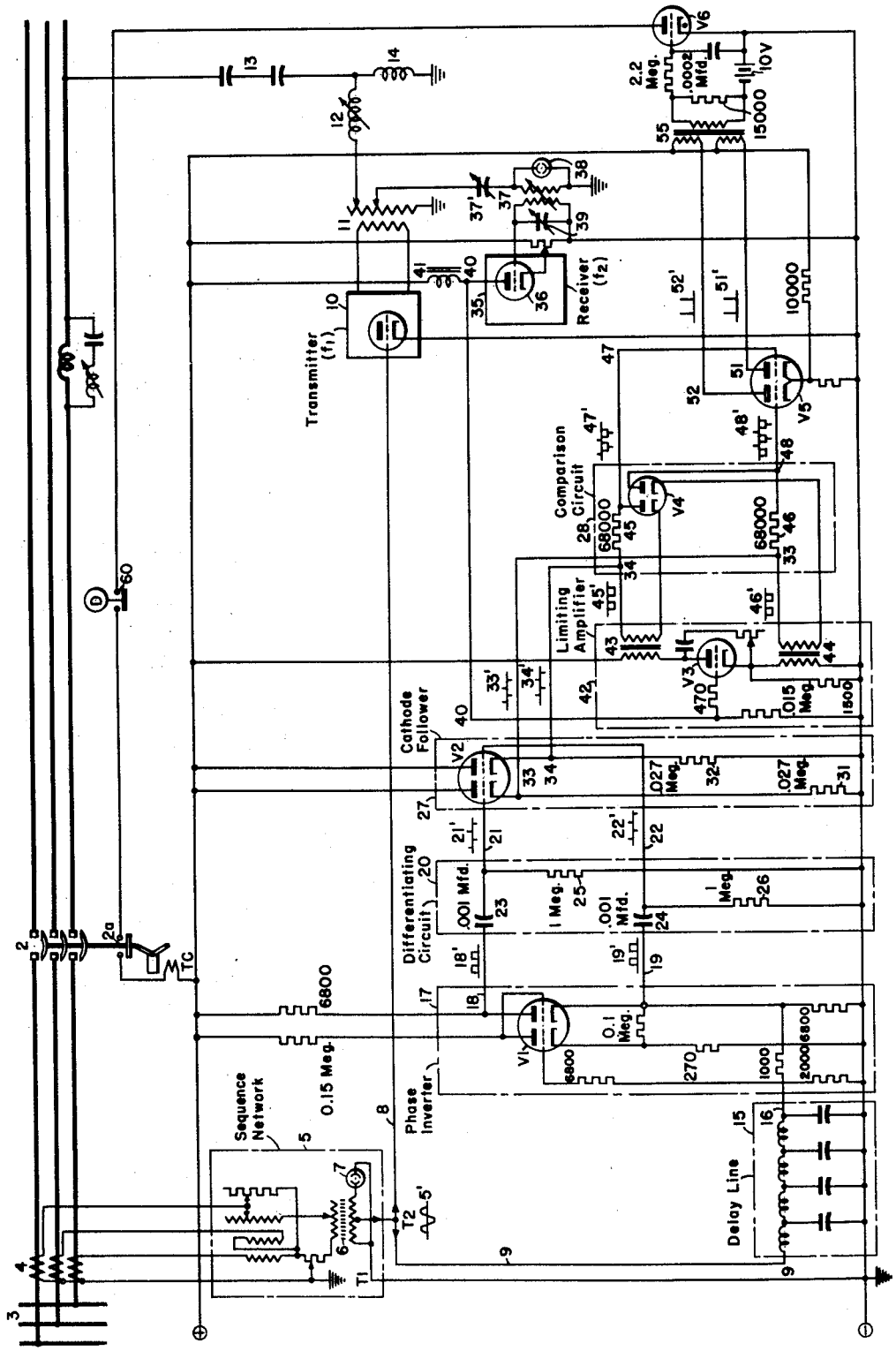

2,917,674
Patented Dec. 15, 1959

2,917,674

HIGH-SPEED CURRENT-COMPARISON RELAY SCHEME

Shirley L. Goldsborough, Newark, N.J., assignor to Westinghouse Electric Corporation, East Pittsburgh, Pa., a corporation of Pennsylvania Application October 22, 1954, Serial No. 463,909

1 Claim. (Cl. 317—28)

My invention relates to a high-speed protective-relay system for alternating-current lines, and it is principally characterized by the ability to trip out all internal faults in one cycle or less, under all conditions, in a sixty-cycle line.

My invention is a novel type of current-comparison pilot-channel relaying system, in which a single-phase current which is derived from each terminal of the protected line-section is used, at each terminal, to continuously produce short-duration positive impulses at about the mid-points of both the positive and negative half-waves of the derived single-phase current, using two relaying circuits at each terminal, one for the impulses which are derived from the positive half-waves, and the other for the impulses which are derived from the negative half-waves. This same derived single-phase current is also used, at each terminal, to continuously transmit a correspondingly timed wave to the other terminal of the protected line-section. These functions are performed continuously, both during normal fault-free operating-conditions, and during fault-conditions, whether the fault is an internal fault between the two ends of the protected line-section, or an external fault in some part of the transmission system outside of the protected section. At each terminal, the received wave-forms, which are transmitted to it from the other line-terminal, are used to continuously produce two blocking-circuits, one containing approximately square-topped negative half-waves during the negative half-cycles of the received single-phase current, and the other containing approximately square-topped negative half-waves during the positive half-cycles of the received single-phase current. The two sets of positive peaks or impulses are added to the corresponding sets of half-wave blocking-currents or voltages, to secure tripping-impulses when the positive impulses are not being blocked by a negative half-wave blocking-current or voltage.

My invention thus requires two different pilot-channels or communicating channels between the two terminals of the protected line-section, in order that each pilot-channel may transmit its own single-phase current, without being affected by the single-phase current which is being transmitted over the other pilot-channel. Usually, these pilot-channels will be carrier-current channels, and since two channels are required, it will be necessary to provide, at each line-terminal, a carrier-current transmitter of one carrier-frequency and a carrier-current receiver which is tuned to another carrier-frequency which is the frequency of the transmitter at the other line-terminal.

By performing the above-described functions continuously, I avoid the time-delays which have heretofore been encountered in first having to detect a fault condition, and then initiate a transmission of the locally derived single-phase wave-form to the other line-terminal. By securing two sets of positive impulses, 180 degrees out of phase with each other, and comparing each of these sets of positive impulses with one of the two sets of negative blocking half-waves obtained from the derived single-phase current at the other line-terminal, it is possible to obtain a directional current-comparing operation during each half-cycle of the locally derived single-phase current, thus obtaining two current-comparing operations during each cycle of the line-frequency current. The only time-delay which is involved in my invention is the 90-degree phase-lag which is necessary in order to bring the positive pips or impulses approximately into the mid-point of the respective half-waves of the locally derived single-phase current, and hence, if this quarter-cycle delay should cause a missing of the first positive pip after the occurrence of a fault which occurs late in one half-cycle of the derived single-phase current, then the current-comparison will be made during the next half-cycle, which will still occur before the expiration of one complete cycle of the line-frequency current.

With the foregoing and other objects in view, my invention consists in the circuits, systems, combinations, methods and parts, hereinafter described, and illustrated in the accompanying drawing, wherein the single figure is a much simplified diagrammatic view of circuits and apparatus illustrating my invention in a preferred form of embodiment.

I have illustrated my invention in connection with a three-phase transmission-line section, one end of which is indicated at 1 in the drawing. It is believed that a showing of the protective apparatus at one end of the protected line-section 1 will suffice for both ends, as the protective apparatus at the two ends of the protected line-section are, or may be, identical with each other, except for the matter of the tuning-adjustment of the frequencies $f_1$ and $f_2$ of the carrier-current transmitter and receiver, the frequencies of which are reversed, at the two ends of the line-section, as will be subsequently described.

The illustrated terminal of the protected line-section 1 is shown as being provided with a circuit-breaker 2, or other line-segregating circuit-interrupting means, for disconnecting the line from other apparatus, such as a bus 3. The circuit-breaker 2 is illustrated as having a trip-coil TC, or equivalent breaker-controlling means, which is energized by my current-comparison equipment.

I use a bank of line-current transformers 4, which responds to the three-phase line-current in the protected line-section 1, and which supplies this current to any suitable phase-sequence network or filter 5, for deriving a single-phase voltage or current which is reasonably uniformly responsive to a plurality of kinds and severities of faults on whatever line-phase a fault may occur. Such a sequence-network 5 frequently includes a saturable transformer 6, the secondary winding of which is shunted by a voltage-limiting gas-filled tube 7, as is well known in the art. The sequence-network 5 has two output-terminals T1 and T2, in which the output-voltage is approximately sinusoidal during normal line-operating conditions and also during mild fault-values, as indicated at 5', but this output-voltage usually becomes quite flat-topped under severe fault-conditions.

Of the two sequence-network output-terminals T1 and T2, the terminal T1 is shown as being grounded, and the terminal T2 is shown as energizing two circuits 8 and 9. The circuit 8 is used to modulate a carrier-current transmitter 10 which is continuously generating carrier-current of a frequency $f_1$, and which is coupled to one phase of the line 1 through the usual output-transformer 11, tuning unit 12, and coupling capacitors 13, the latter being grounded through the usual drain-coil 14. This network-modulated transmitter 10 is the means for transmitting a wave-shape which is synchronous with the derived single-phase voltage in the output-terminal T2 of the sequence network 5, and the transmitted wave-form is received, at the other line-terminal (not shown), by a carrier-current receiver which is tuned to the same frequency $f_1$. In general, this illustration may be taken as being representative of any suitable communication-channel between the two terminals of the line-section.

The output-terminal T2 of the sequence-network 5 branches off, through the conductor 9, to a phase or current-comparing tripping-circuit which is shown as including, first, a delay-line 15, for introducing a quarter-cycle delay in the derived single-phase voltage of the network-terminal T2. Since the network-output is not always sinusoidal, but becomes quite flat-topped during heavy fault-current conditions, during which it is essential that my current-comparing apparatus be perfectly operative, it is preferable that my quarter-cycle lagging-means be a delay-line 15, having distributed series inductance and shunt capacitance, as is known in the art, rather than a simple inductive impedance which would operate quite differently during the harmonic-loaded square-wave conditions than during the normal sinusoidal-wave conditions.

The delay-line 15 has an output-circuit 16, which is connected to a phase-inverter 17 comprising a tube V1, the function of which is to split the single-phase voltage of the output-circuit 16 into two square-topped, constant-magnitude, alternate-cycle waves, 180 degrees apart, in the two output-terminals or relaying-circuits 18 and 19, as indicated by the wave-forms 18' and 19', respectively. The wave 18' consists of a succession of square-topped positive half-waves approximately corresponding, in length and timing, to the positive half-waves of the single-phase line voltage which is received from the delay-line terminal 16; while the wave-form 19' consists of a succession of square-topped positive half-waves approximately corresponding, in length and timing, to the negative half-waves of the single-phase voltage which is received from the delay-line terminal 16.

My phase or current-comparing apparatus includes a number of electronic elements, which are well known in the art, and which thus require no detailed description. In each case, I have indicated certain possible values of some of the circuit-elements such as resistances and capacitances, but these indicated values are only by way of illustration, as my invention is by no means limited to these precise values. For convenience in illustration, it is assumed that the trip-circuit station-battery is used also as a plate-circuit battery for the electronic equipment, and this battery is indicated by its terminals (+) and (−), as an indication of any suitable source of direct-current voltage. The negative battery-terminal (−) is shown as being grounded.

The voltages of the phase-inverter circuits 18 and 19 are supplied to a differentiating circuit 20, the function of which is to produce a very brief or short-duration impulse at the beginning and at the end of each of the half-wave square-topped impulses 18' and 19' of the circuits 18 and 19, respectively. At the beginning of each positive square-topped half-wave, the differentiating circuit 20 produces a very short brief positive impulse or pip, and at the end of each positive square-topped half-wave, the differentiating circuit 20 produces a very short brief negative impulse or pip. These impulses or pips are produced in the two output-circuits 21 and 22 of the differentiating circuit 20, the respective wave-forms being indicated at 21' and 22', respectively. Since the square-topped waves 18' and 19' of the two circuits 18 and 19 are 180 degrees out of phase with each other, it will be noted that the brief positive impulses of the second impulsed wave-form 22', which is derived from the second square-wave circuit 19, occur at the endings of the positive half-waves of the first square-wave circuit 18.

There are a number of differentiating circuits which would perform the functions just described. The particular differentiating circuit which I have chosen for illustration comprises capacitors 23 and 24, which are serially connected, respectively, between the circuits 18 and 21, and the circuits 19 and 22, these capacitors being charged and discharged through suitable resistors 25 and 26, respectively. While I have shown a differentiating circuit 20 which produces negative impulses as well as positive impulses, it will be understood, during the further description of my invention, that only the positive impulses are used, the negative impulses being ineffective, and therefore disregarded, so that it is not necessary even to block out these negative impulses.

The brief impulses of the circuits 21 and 22 are supplied to the respective grids of a double-triode valve V2, which serves as a dual cathode-follower stage 27, the primary function of which is to serve as an impedance-changing device between the differentiating circuit 20 and a comparison-circuit 28, which will be subsequently described. The cathode-follower tube V2 has two cathode-resistors 31 and 32, the voltages of which are tapped in output-circuits 33 and 34, wherein are produced wave-forms 33' and 34' consisting of a succession of impulses which are the same, in time-scale, as those shown at 21' and 22', respectively.

The illustrated carrier-current equipment includes a receiver 35, including a receiver-tube 36, the grid circuit of which is coupled to the carrier-current output-transformer 11 through a receiver-coupling transformer 37 and a tuning capacitor 37'. The primary winding of the receiver-coupling transformer 37 is usually protected by a shunt-connected voltage-limiting gas-filled tube 38. The secondary winding of the receiver-coupling transformer 37 is a part of a tuned receiving-circuit which also includes a tuning capacitor 39. The tuned circuits of the receiver 35 are tuned to a carrier-current frequency $f_2$ which is different from the transmitter-frequency $f_1$ at the illustrated terminal, but which is the same as the transmitter-frequency at the remote terminal of the protected line-section 1.

The receiver 35 has a plate circuit 40, in which the carrier-frequency currents are blocked by a carrier-frequency choke coil 41, so that this plate circuit 40 contains a voltage corresponding to the wave-form of the line-frequency single-phase current or voltage which is transmitted from the other terminal of the protected line-section.

The received carrier-signal which is obtained in the plate circuit 40 of the receiver 35 is fed into the grid-circuit of a tube V3 of a limiting amplifier 42, which has a plate-cathode circuit containing constant-magnitude square-topped waves corresponding to the received signal. Two output-transformers 43 and 44 are provided in this limiting amplifier 42, for feeding the output of the amplifier, with opposite polarities, into two loading-resistors 45 and 46, through the respective rectifier-circuits of a double-diode valve V4, which cuts off the positive half-waves of each loading-circuit.

The effect of this combination, in the limiting amplifier 42, is to obtain two different voltage-drops across the terminals of the two loading-resistors 45 and 46, each voltage-drop consisting of only the negative halves of the square-topped output of the limiting amplifier 42, as indicated at 45' and 46', respectively, thus producing square-topped half-circles of blocking voltage, corresponding in phase to the received signal, but 180 degrees out of phase with each other, because of the opposite-polarity connections of the two transformers 43 and 44. The first wave-form 45' may be considered to be a series of approximately square-topped negative half-waves of blocking voltages approximately corresponding, in phase and duration, to the positive half-waves of the received quantity; while the second wave-form 46' may be considered to be a series of approximately square-topped negative half-waves of blocking voltages approximately corresponding, in phase and duration, to the negative half-waves of the received quantity.

The comparison of the relative phases or directions of the derived single-phase voltages of the local and remote terminals of the protected line-section is effected by connecting the output-circuits 34 and 33 of the cathode follower 27 to the negative terminals of the two blocking-circuit resistors 45 and 46, respectively, and connecting the positive terminals of these resistors to the grid circuits 47 and 48 of a double-triode relay-tube V5. These grid-circuits 47 and 48 thus receive wave-forms 47' and 48' which are compounded of the superimposed locally derived positive pulses 34' and 33' and the square-topped negative pulses 45' and 46' which are derived from the received wave. The loading resistances 45 and 46, with their double inputs from the cathode follower 27 and the limiting amplifier 42, thus comprise a comparison circuit 28 in which the positive pulses of the output-circuits 34 and 33 of the cathode follower 27 are tested against the square-topped half-wave blocking voltages which are received from the remote end of the protected line-section 1. If there should be an internal fault, within the confines of the protected line-section 1, the blocking half-waves will be out of phase with the positive impulses which are derived from the local line-current, as shown in the wave-forms 47' and 48'.

The relay-tube V5 has two plate-circuits 51 and 52 which carry very brief pulses of current, as indicated at 51' and 52', provided that the positive pulses 34' and 33' of the cathode follower 27 are not blocked by the negative half-cycle blocking-voltages of the limiting amplifier 42. These two plate-circuits 51 and 52 are connected to the two primary windings of a relay output transformer 55, the secondary winding of which is used to fire a gas-filled tripping-tube V6, which thus becomes conducting when it receives a brief pulse of positive firing-voltage from the unopposed positive pulse of one of the cathode-follower circuits 34 or 33, in the event of an internal fault. One fired, the tripping tube V6 will continue to conduct a temporarily sustained current until its plate-circuit energy is interrupted, as at the circuit-breaker auxiliary contacts 2a which open when the breaker opens. The plate circuit of the firing tube V6 contains the trip coil TC of the circuit breaker 2, or other protective-circuit means.

It will usually be desirable also to include, in this plate circuit of the tripping tube V6, the make-contacts 60 of a supervisory detector-means D, which quickly closes its contact in the event of a fault on the protected transmission line. The operating time of this fault-sensing detector D runs concurrently with the current-comparing operation of my invention, so that the beginning of the current-comparison does not need to wait for the completion of the fault-detecting operation. If the fault-detector D has a sufficiently high speed, it will thus not interfere with the high speed of operation of my current-comparison means. It will be understood that the detector D is not necessary to my invention, being merely a possibly unneeded safeguard which many station-engineers will prefer as a safeguard against the remote possibility of an erroneous shock-excitation of the current-comparison equipment.

Several things contribute to the high speed, and the reliability of operation, of my current-comparison system. In the first place, I am constantly comparing the derived single-phase line-frequency currents at the two ends of the protected line-section, so that my comparison-apparatus is always functioning, even during the normal fault-free operation of the transmission system of which the protected line-section 1 is a part. If an external fault should occur, outside of the confines of the protected line-section 1, there will not be any great change in the relative phase-angles of the two derived line-frequency currents at the two terminals of the protected line section, as obtained in the respective sequence-network terminals T2 at the two stations. Thus, there will be no tripping. But if the fault is an internal fault, with the fault-current flowing into the protected line-section 1 from both ends of the section, then the two derived line-frequency currents or voltages of the respective sequence-networks 5 at the two ends of the section will be out of phase with each other, and the blocking half-waves of voltage 45' and 46' will be out of phase with the positive tripping impulses of the pulsed waves 34' and 33' which are derived from the local line-current, thus producing unblocked positive tripping-impulses as shown in 47' and 48'. The first such unblocked tripping-impulse to reach either circuit of the relay-tube V5 will produce a tripping-impulse which will fire the gas-filled tripping-tube V6, so as to cause a tripping operation at that end of the line-section.

A second means which is an essential part of a one-cycle current-comparison relaying system, in accordance with my invention, is the provision of two local channels or relaying-circuits of brief-duration positive tripping-impulses, derived from opposite half-cycles of the local sequence-network output, so that a current-comparing operation is made twice during each cycle of the line-frequency current. Thus, if a fault occurs too late in one half-cycle to effect a current-comparison with respect to the current-direction in the remote line-terminal, then the current-comparing operation will be effected in the next half-cycle, thus avoiding the necessity for waiting for longer than a complete line-frequency cycle before obtaining a current-comparison indication.

A third expedient whereby fast and reliable current-comparison operations may be obtained, involves the use of derived tripping-impulses of very brief duration, which occur at approximately the mid-points of the respective positive and negative half-waves of the locally derived single-phase line-frequency current, while using substantially square-topped blocking half-waves which are obtained from the corresponding half-cycles of the derived current at the other end of the protected line-section. In this way, I avoid the necessity for building a certain amount of sluggishness or integrating sense into the tripping-relay, which is represented, in my illustrated form of embodiment, as in instantaneously operating tube V6. In the previously used current-comparison system, as shown in the Lensner et al. Patent 2,539,444 of January 30, 1951, very brief spurious tripping-impulses were obtained as a result of the fact that the tripping and blocking half-cycles are never exactly in phase or out of phase with each other, so that it was necessary to give the tripping-relay a small time-delay in order to override these small tripping-impulses during an external fault.

A fourth means which I use, for avoiding unnecessary time-delays, involves the use of an impulse-producing means which waits until practically the mid-point of each half-cycle of the derived line-frequency current before producing an impulse. No time-delay is built into the receiving equipment for producing the negative half-cycles of blocking voltages, so that, when a fault occurs, the blocking voltage is always ready, and the tripping impulse does not occur until a quarter-cycle later, so that, by the time the tripping-impulse comes, it is certain that a blocking half-wave of voltage will already be in existence, ready to block the tripping-impulse except when there is an internal fault.

Another feature which makes my continuous current-comparison feasible, with the use of carrier-current relaying, which is usually the most economical form of means for providing suitable communicating channels between the two line-section terminals, is the use of sinusoidal-wave modulation of the carrier-current energy, in accordance with the sinusoidal wave-form of the derived single-phase line-frequency quantity of the sequence-network 5 at each terminal. In the previously used current-comparison system of the Lensner et al. Patent 2,539,444, the transmitted line-frequency signals were square-topped in wave-shape, thus introducing considerable interference which was caused by the large number of harmonics of the square-topped wave. While such interference could be tolerated for the few cycles required to clear a fault, in an intermittent-carrier-current protective relay system in which the carrier-current transmission was initiated only after the detection of a fault-condition, such interference could not be tolerated with the use of continuous pilot-channel operation as required by my present one-cycle relay.

Some or all of the features or basic elements which are used in my present novel combination have been known before, in other situations or combinations which did not produce one-cycle current-comparison relaying. For example, two-frequency carrier-channels were known before, in the Bostwick Patent 2,275,941 of March 10, 1942, in a system which would not warrant the complication because it would not achieve one-cycle current-comparison. The use of very brief tripping-impulses and square-topped blocking-voltages was also known previously, in the Lensner Patent 2,406,616 of August 27, 1946, but in a system in which a tripping-impulse was not provided during each half-cycle of the locally derived line-frequency current, and in which continuous carrier-current operation was not employed, so that it was necessary first to detect a fault, and then to start the carrier-current transmission, before commencing a current-comparing operation which would take place only once during each line-frequency cycle, thus involving time-delays which rendered the complication of this previous Lensner system unacceptable for commercial use.

While I have illustrated the basic general principles of my invention in but a single form of embodiment, with suggested or illustrative forms of the various block-diagrams or elements which enter into the novel combination of my invention, I wish it to be understood that I am not at all limited to the illustrated form of embodiment, and that various substitutions of equivalent elements, or omissions or additions of refinements, can be used without departing from the essential spirit of my invention, in its broader aspects.

I claim as my invention:

A current-comparison protective relaying system for an alternating-current line-section, comprising the following equipment at each of two terminals of the protected line-section: a means for deriving a single-phase line-frequency electrical quantity from the line current or currents at the relaying terminal; a means for continuously transmitting, to the other line-terminal, a single-phase electrical quantity having the same timing and phasing as said derived quantity; a means for providing a delayed single-phase quantity which lags said derived quantity by approximately a quarter of a line-frequency cycle; a means for deriving an approximately square-topped electrical quantity having a succession of delayed positive fixed-magnitude half-waves which begin and end substantially at the instance of the beginnings and endings of the successive positive half-waves of said delayed quantity; a means for providing a first relaying circuit in which there is continuously produced a series of brief positive impulses at the beginnings of said succession of delayed positive half-waves; a means for providing a second relaying circuit in which there is continuously produced a series of brief positive impulses at the endings of said succession of delayed positive half-waves; a means for continuously receiving the single-phase electrical quantity which is being transmitted from the other terminal of the protected line-section; a means for providing a first blocking-circuit means, in which ther is continuously produced a series of approximately square-topped negative half-waves of blocking voltages approximately corresponding, in phase and duration, to the positive half-waves of the received quantity; a means for providing a second blocking-circuit means, in which there is continuously produced a series of approximately square-topped negative half-waves of blocking voltages approximately corresponding, in phase and duration, to the negative half-waves of the received quantity; a means for electrically combining each of said positive-impulse relaying circiuts with one of said blocking-circuit means, in such polarity that the positive impulses of each relaying circuit are not blocked by the associated negative blocking half-waves when there is an internal fault within the confines of the protected line-section; and a means for producing a temporarily sustained protective-circuit current in response to such unblocked positive impulses in either relaying circuit.

References Cited in the file of this patent

UNITED STATES PATENTS

| | | |
|---|---|---|
| 2,275,941 | Bostwick | Mar. 10, 1942 |
| 2,406,616 | Lensner | Aug. 27, 1946 |
| 2,408,868 | Mehring | Oct. 8, 1946 |
| 2,539,444 | Lensner et al. | Jan. 30, 1951 |
| 2,594,371 | Ward | Apr. 29, 1952 |
| 2,710,368 | Wylie et al. | June 7, 1955 |